United States Patent [19]

Barkan

[11] 4,184,186
[45] Jan. 15, 1980

[54] CURRENT LIMITING DEVICE FOR AN ELECTRIC POWER SYSTEM

[75] Inventor: Philip Barkan, Media, Pa.

[73] Assignee: General Electric Company, Philadelphia, Pa.

[21] Appl. No.: 830,942

[22] Filed: Sep. 6, 1977

[51] Int. Cl.² ............................................. H02H 3/08
[52] U.S. Cl. ...................................... 361/10; 361/57; 361/58
[58] Field of Search ................... 323/74, 82; 361/8, 9, 361/10, 11, 13, 54, 55, 57, 58, 71

[56] References Cited

U.S. PATENT DOCUMENTS

| | | | |
|---|---|---|---|
| 1,667,662 | 4/1928 | Holbrook | 361/13 |
| 3,227,924 | 1/1966 | Wutz | 361/13 |
| 3,660,721 | 5/1972 | Baird | 361/55 |
| 3,873,887 | 3/1975 | Barkan et al. | 361/71 |

FOREIGN PATENT DOCUMENTS 1588457  7/1973  Fed. Rep. of Germany ............. 361/54
1121078  7/1968  United Kingdom .

Primary Examiner—A. D. Pellinen
Attorney, Agent, or Firm—William Freedman; Carl L. Silverman

[57] ABSTRACT

This current limiting device comprises a normally-closed source-side circuit interrupter, a normally-closed load-side circuit interrupter, an electrical conductor connected between the interrupters for connecting the interrupters in series, and a normally-open switch that can be closed to connect the conductor to ground via a low-impedance conductive path located electrically between the interrupters. A switch operator acts to rapidly close the switch in response to a fault on the power circuit extending through the series combination of interrupters, thereby connecting the conductor to ground through the switch. The switch operator closes the switch within ¼ cycle of power frequency current after fault inception, thereby effecting current-limiting action with respect to current through the series combination of interrupters on the load side of the conductive path to ground. The interrupters are opened in response to the fault by the switch operator acting through a mechanical connection between the switch operator and the interrupters. Such interrupter-opening occurs sufficiently rapidly that the source-side interrupter interrupts the current therethrough at the first natural current zero following fault-inception. An impedance connected in parallel with the series combination of the interrupters conducts current, limited in magnitude by impedance, around the interrupters when the two interrupters have interrupted the currents therethrough following their opening.

41 Claims, 13 Drawing Figures

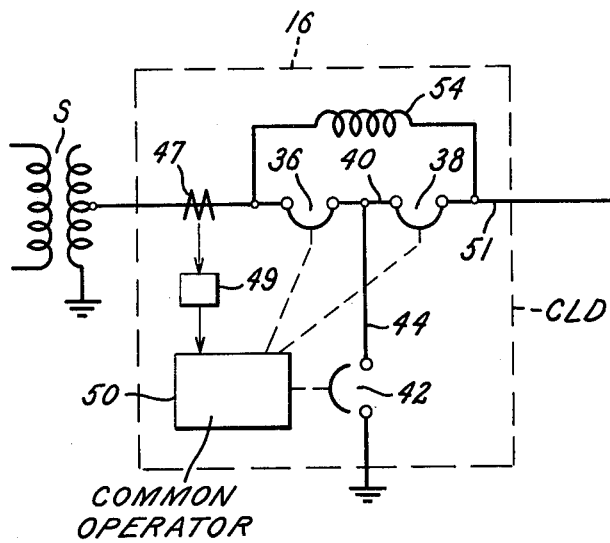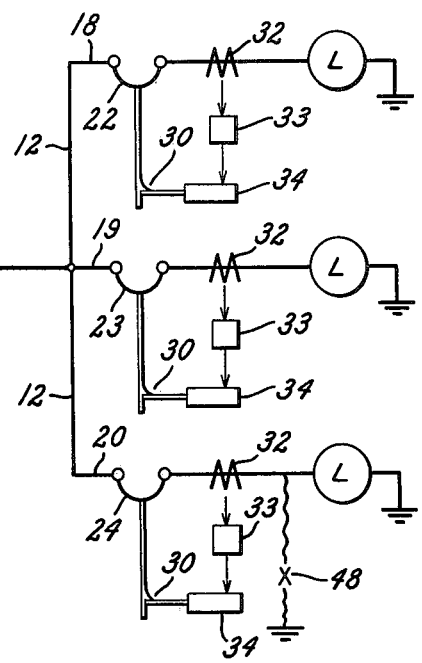
Fig. 1.
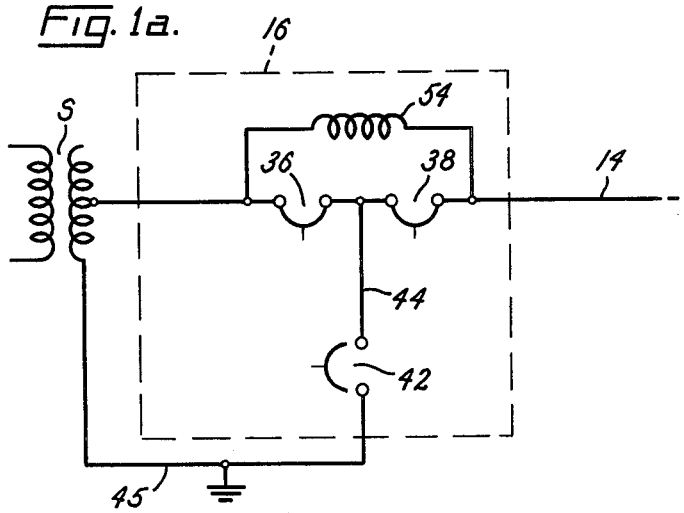
Fig. 1a.
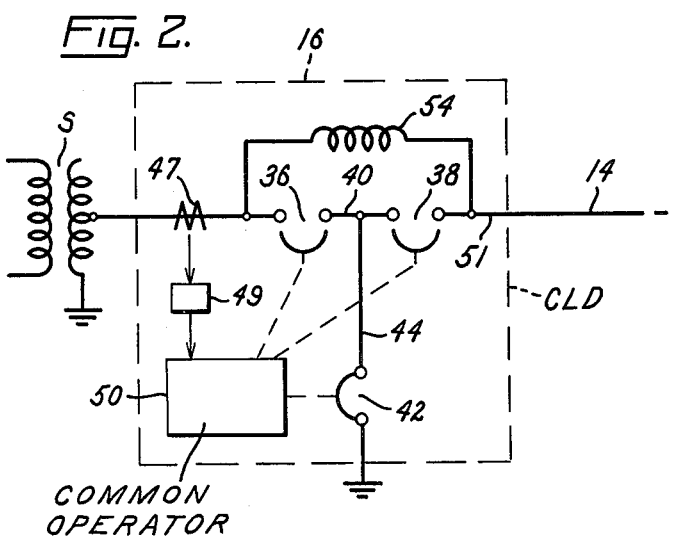
Fig. 2.

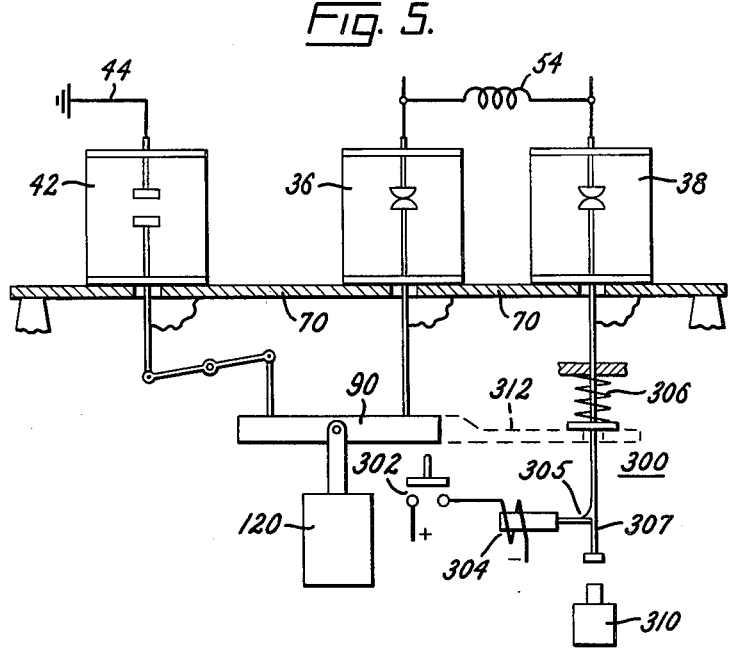
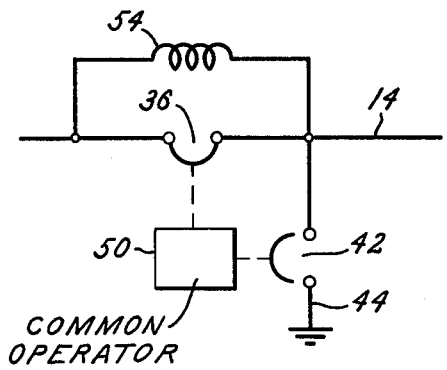
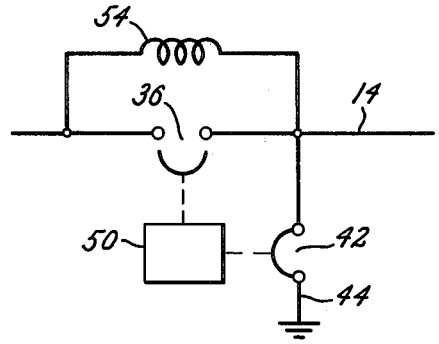
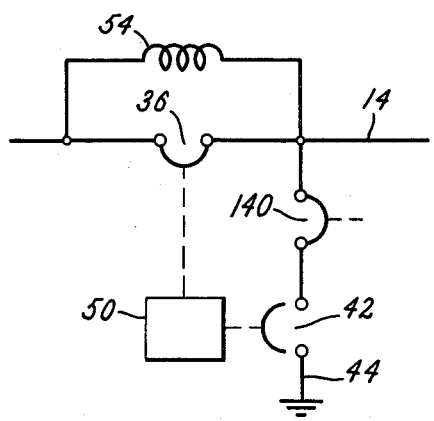
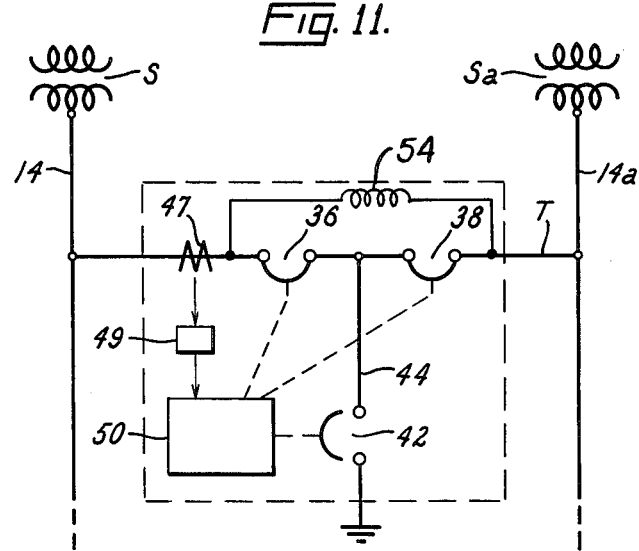

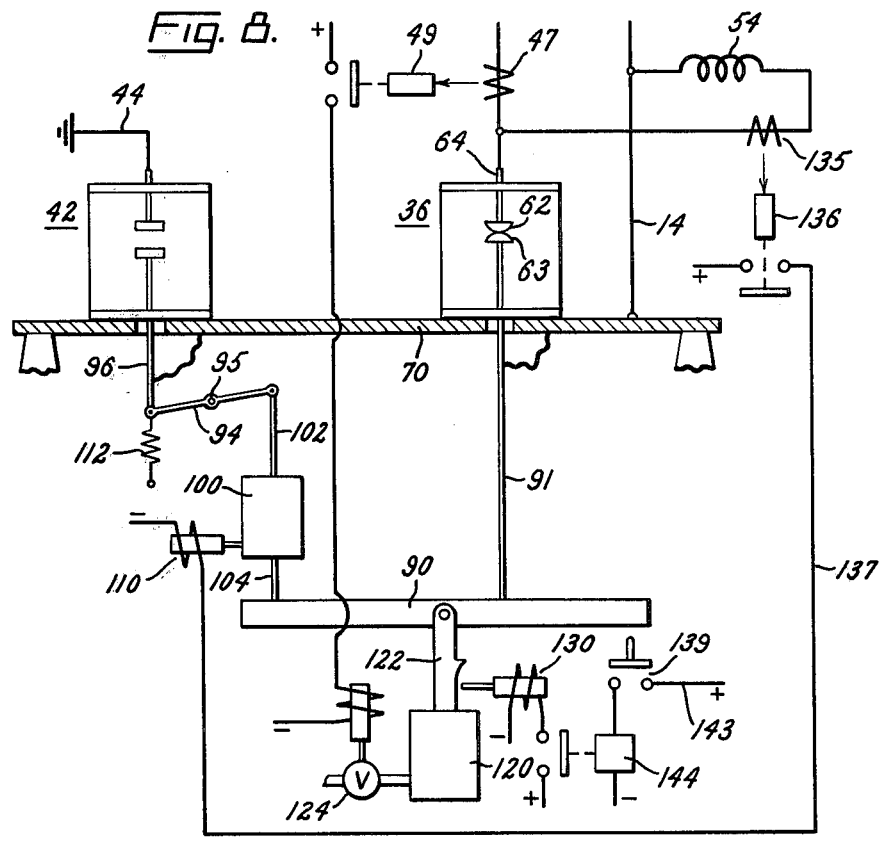
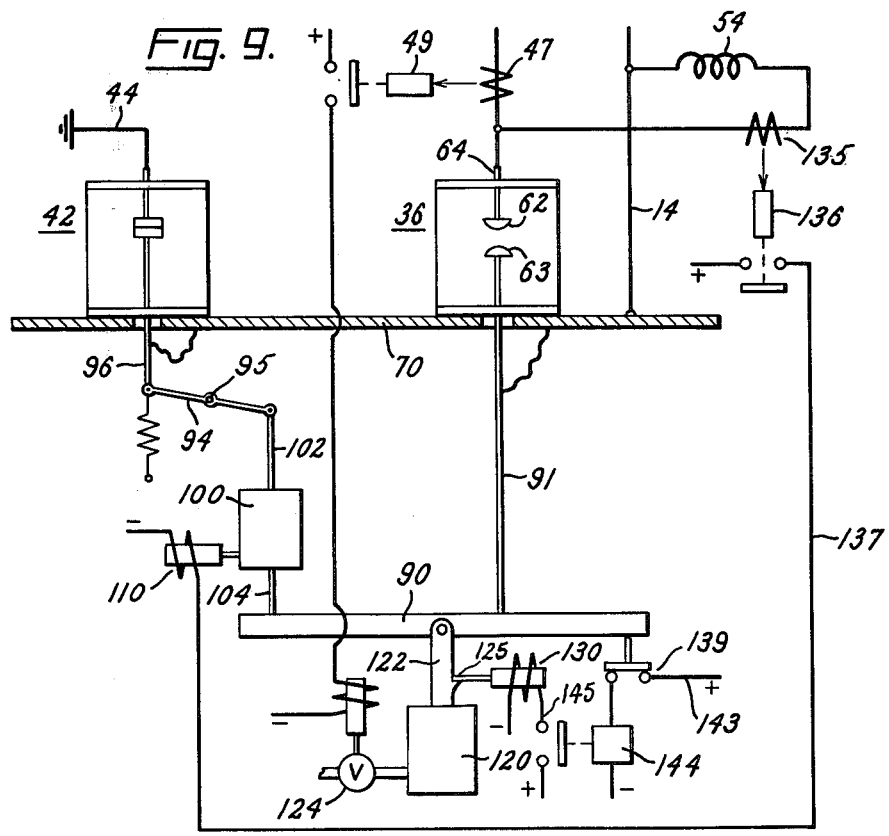

CURRENT LIMITING DEVICE FOR AN ELECTRIC POWER SYSTEM

BACKGROUND

This invention relates to a current limiting device for an alternating-current electric power system and, more particularly, relates to a current limiting device that achieves current-limiting action on the first loop of current following fault inception by rapidly diverting fault current through a low impedance path to ground.

A current limiting device may be thought of as a device which is capable of limiting the peak current allowed to pass therethrough into a negligible impedance fault at its load terminal to a value substantially below the peak of the prospective current of the system at the fault. In referring to the prospective current of the system at a given point in the circuit, applicant is using this terminology in the sense defined in the American National Standard Definitions for Power Switchgear, Publication ANSI C37-100-1972, pages 8 and 9, published in 1972 by the Institute of Electrical and Electronic Engineers, New York, N.Y.

Most efforts to achieve a practical current limiting device for power systems rated at more than a few thousand volts have approached the current limiting problem in a very difficult, head-on manner, attempting to achieve current limitation by rapid insertion of an impedance, either resistive or inductive, into the power system to limit the first current peak. Such approaches have been subject to some fundamental difficulties, such as one or more of the following: prohibitive initial cost, inability to quickly transfer current into the impedance being inserted, unacceptable continuous losses, excessive complexity and resultant low reliability, and inadequate voltage and current handling capabilities. Examples of these approaches are disclosed in a special report (EPRI EL-276-SR) prepared by the Electric Power Research Institute, Palo Alto, Calif., entitled Symposium Proceedings-New Concepts in Fault Current Limiters and Power Circuit Breakers. This report is dated April, 1977 and contains papers presented at a symposium in Buffalo, New York, on Sept. 28-30, 1976.

SUMMARY

An object of my invention is to provide a current limiting device which has a substantially reduced susceptibility to the above-noted difficulties as compared to prior devices.

Another object of my invention is to provide a current limiting device that does not require rapid insertion of an impedance during the first current loop in order to achieve current limiting action with respect to current passing through the device into the portion of the power circuit at its load terminal side.

Another object is to provide a current limiting device that is exceptionally simple, has negligible continuous losses, and has a high degree of current-limiting effectiveness.

The approach that I use involves rapidly establishing at the source side of the fault a low-impedance path to ground through which fault current is diverted. I am aware that high speed "crow-bar" devices have previously been proposed for rapidly establishing such low impedance paths to ground in response to a fault. (See, for example, British Pat. No. 1,121,078-Licentia). But the prior art schemes that I am aware of using such "crow bar" devices have typically, in one way or the other, effectively disabled the power circuit downstream from the grounding path for a relatively long time following operation of the crow-bar device, as, for example, by allowing the grounding path to remain effectively in place for a relatively long time. Moreover, these schemes have typically been relatively slow in interrupting the high current through the low impedance path to ground, thus exposing the portion of the power system upstream from the grounding path to this high current for an unduly long time, thus increasing the chance for damage to the upstream system portion.

Accordingly, another object of my invention is to quickly effectively isolate the low impedance path to ground from the remainder of the power system within a brief period following its initial establishment.

Another object is to achieve current-limiting action in two steps, the first of which involves establishing a low-impedance path to ground to limit the peak current flowing into the load circuit on the first loop (or first few loops) of current, and then, as a second step, quickly isolating this path from the power circuit and inserting an impedance in the power circuit to limit the peak current flowing thereafter into the load circuit.

Still another object is to provide a current limiting device that, following its initial operation in response to a fault, can quickly restore the power system to its normal operating condition immediately following isolation of said fault by a conventional circuit breaker.

In carrying out this invention in one form, I provide a current limiting device comprising: (a) a normally-closed circuit interrupter adapted to be connected in series with a power circuit and having a source terminal and a load terminal at its opposite electrical sides, (b) a normally-open grounding switch, and (c) means comprising said switch and effective when said switch is closed for electrically connecting said load terminal to ground via a low-impedance conductive path located electrically at the load terminal side of the interrupter. Switch-operating means responsive to a fault on the power circuit at the load terminal side of the interrupter rapidly closes the switch, thus connecting said load terminal to ground through the switch.

The switch-operating means operates at such high speed that effective closing of the switch occurs within $\frac{1}{4}$ cycle of power frequency current after inception of said fault, thereby effecting current-limiting action with respect to current passing in series through said interrupter and said load terminal into the portion of the power circuit at the load side of said low-impedance conductive path to ground.

The interrupter is opened in response to said fault by means comprising a mechanical coupling between the switch-operating means and the interrupter, and such opening is sufficiently rapid that the interrupter interrupts current therethrough at one of the first three natural current zeros following fault inception, preferably the first. An impedance in parallel with the interrupter conducts current, limited in magnitude by said impedance, around the interrupter when the interrupter has interrupted the current therethrough. Means effective while the interrupter is open is provided for blocking the flow of current through the series combination of the impedance and the low-impedance conductive path to ground, thus restoring service, via said impedance, to the portion of the power circuit at the load side of the current-limiting device.

BRIEF DESCRIPTION OF DRAWINGS

For a better understanding of the invention, reference may be had to the following description taken in conjunction with the accompanying drawings, wherein:

FIG. 1 is a schematic showing, in one-line diagram form, of a power delivery system including a current limiting device (CLD) embodying one form of my invention. The CLD is shown in its normal position.

FIG. 1a shows a slightly modified form of the power delivery system of FIG. 1.

FIG. 2 is a view of a portion of the system of FIG. 1 with the CLD shown in its operated position.

FIG. 5 is a schematic showing of a modified form of current limiting device.

FIG. 6 is a schematic showing of another modified form of CLD shown in its normal position.

FIG. 7 shows the CLD of FIG. 6 in its operated position.

FIG. 8 is a more detailed but still somewhat schematic showing of the CLD of FIG. 6 shown in its normal position.

FIG. 9 shows the CLD of FIG. 8 in its operated position during a timing operation preceding reclosing of the interrupter and opening of the grounding switch.

FIG. 10 is a schematic showing of another modified CLD embodying another form of the invention.

FIG. 11 shows the CLD of FIGS. 1-4 being applied in a tie-line of a power system.

DETAILED DESCRIPTION OF PREFERRED EMBODIMENTS

Figure 3:
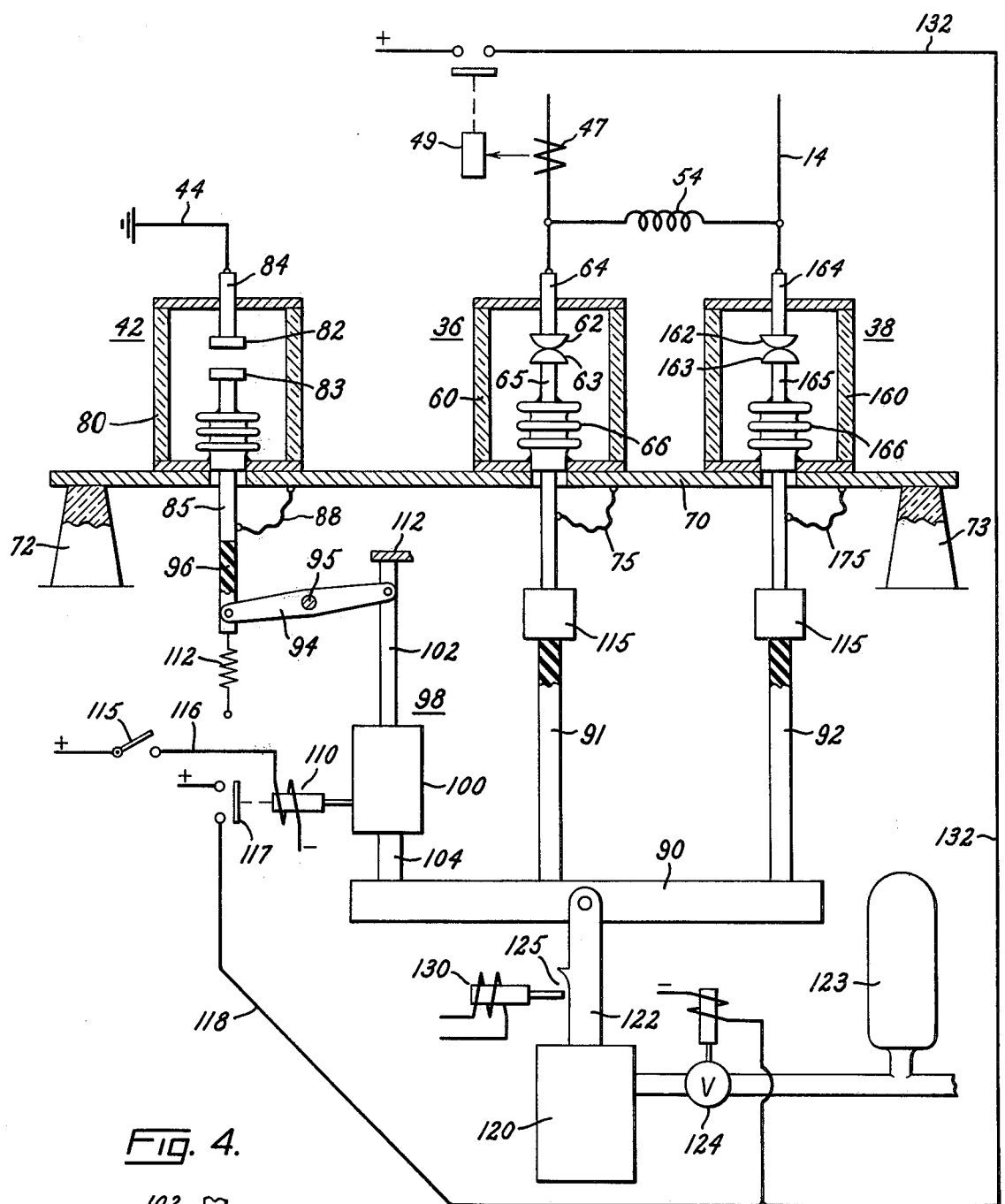
FIG. 3 is a more detailed but still somewhat schematic showing of the CLD of FIG. 1.
Figure 4:
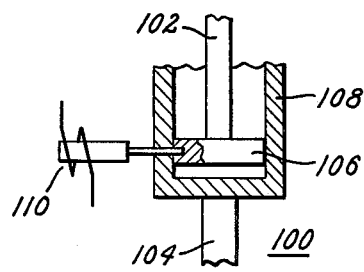
FIG. 4 is an enlarged sectional view of a portion of the CLD of FIG. 3 and, more particularly, of a releasable coupling used in FIG. 3.

Referring now to the one-line diagram of FIG. 1, there is shown an alternating-current power delivery system for delivering power from a source S, such as a transformer, to a plurality of loads L. The transformer is shown with one terminal of its secondary winding connected to ground. The power delivery system comprises a power distribution line 14 connecting source S and a secondary bus 12. A current limiting device (CLD) 16 (soon to be described) is connected in series with the distribution line 14 between the source S and the secondary bus 12. The source S may, of course, comprise additional source units, such as one or more additional transformers connected in parallel with the illustrated transformer.

Connected to the secondary bus 12 are a plurality of branch circuits 18, 19 and 20 for delivering power from the secondary bus to the loads L. These branch circuits are respectively connected to the secondary bus through conventional normally-closed circuit breakers 22, 23, and 24, respectively. The branch circuit breakers may be thought of as connected in parallel with each other and in series with the current limiting device 16.

Each of the branch circuit breakers is a low capacity circuit breaker of a conventional type that includes relatively slow current-responsive means for automatically opening the branch circuit breaker in response to an overcurrent in the branch circuit. In the illustrated embodiment, each branch circuit breaker is depicted as comprising separable contacts suitably biased toward open position and normally held closed by a conventional trip latch 30. The trip latch is operated in response to overcurrents in a conventional manner, as by a current transformer 32 coupled to the associated branch, an overcurrent relay 33 operated in response to output from the current transformer indicative of an overcurrent, and a tripping solenoid 34 operated in response to operation of the overcurrent relay. Since this overcurrent-sensitive tripping arrangement is of a conventional design, it is shown in diagrammatic form only. The trip latch 30 is operated within several cycles after the inception of a fault on the branch circuit. Typically each of the branch circuit breakers, operating with conventional fault-responsive relays, is capable of completing its interrupting operation within three to six cycles after fault inception. In one application of the invention, these circuit breakers are provided with means for quickly reclosing them after an opening operation, as will be referred to in more detail hereinafter.

The current limiting device 16 comprises two normally-closed circuit interrupters 36 and 38, each comprising a pair of separable contacts shown in FIG. 1 in the closed position. These interrupters are electrically connected in series with each other in the power line 14 by means of a conductor 40 connected between the two interrupters. Interrupter 36 is at the source side of conductor 40, and interrupter 38 is at the load side of the conductor 40. The current limiting device further comprises a normally-open switch 42 connected in a circuit 44 extending between the conductor 40 and ground. When switch 42 is closed, conductor 40 is electrically connected to ground via the low impedance conductive path extending through switch 42.

A common operator 50 is provided for the interrupters 36 and 38 and the switch 42. This operator operates the current limiting device from its position of FIG. 1 to that of FIG. 2 in response to a severe fault on power line 14 or on the circuits 12, 18, 19, or 20 fed by the power line. For rapidly sensing the presence of such a severe fault, I rely upon a high speed fault-sensing relay, preferably of the type disclosed and claimed in U.S. Pat. No. 3,673,455-Dewey, assigned to the assignee of the present invention. This relay, which is schematically shown at 49, is coupled to the power line 14 by a current transformer 47; and in response to a severe fault, it very rapidly supplies a starting command to the operator 50. (For low current faults, the relay 49 remains inactive and allows the appropriate conventional circuit breaker, such as 22, 23, or 24, to interrupt the pertinent current).

Immediately upon receipt of the above-described starting command from relay 49, operator 50 operates to close the grounding switch 42 and open the interrupters 36 and 38, effecting these operations substantially simultaneously through a mechanical coupling between the common operator and the interrupters 36 and 38 and the grounding switch 42. At the end of this operation, the parts of the current limiting device are in their position of FIG. 2. The operator 50 operates at such high speed that effective closing of the switch 42 occurs within less than ¼ cycle of power frequency current, and preferably within 2 to 3 milliseconds, after inception of a severe fault, such as a severe fault 48 on branch circuit 20. Closing of switch 42 completes the low-impedance circuit 44 to ground, thus diverting into the grounding circuit 44 current that had been flowing from the source S to the fault 48. This diversion of current into the then-completed low-impedance grounding circuit 44 effects a powerful current-limiting action on the current flowing through the series combination of interrupters 36 and 38 via load terminal 51 of the CLD, rapidly driving this current to a very low value.

The effectiveness of the closure of the grounding switch 42 in limiting current depends to a significant extent upon the grounding path 44 and the return path to the grounded terminal of the transformer S having a very low impedance. If the current limiting device 16 is located relatively close to the transformer, a low-impedance, high-conductivity metal conductor, shown at 45 in FIG. 1a, can be used for electrically interconnecting the grounding circuit 44 to the grounded terminal of the transformer, thus providing an exceptionally low impedance return path to the transformer for current diverted by closure of grounding switch 42. It is to be understood that in referring herein to a low-impedance path to ground, I intend to comprehend within such terminology the circuit 44 of FIG. 1a (when grounding switch 42 is closed) as well as the circuit 44 of FIGS. 1 and 2.

The current flowing through conductive path 44 to ground also flows through the interrupter 36; but interrupter 36, having already separated its contacts and established an arc between the contacts, interrupts the current at the first natural current zero following fault-inception. In a preferred form of the invention, the interrupters 36 and 38 are vacuum interrupters, and such interrupters are readily capable of interrupting current at the first natural current-zero of the current flowing therethrough following contact-separation. The mechanical coupling between the movable contact structure of grounding switch 42 and that of interrupter 36 assures that, if interrupter 36 is a good vacuum interrupter, its contacts will be sufficiently separated to effect interruption of the current therethrough at the first natural current zero following fault-inception.

Although in a preferred form of the invention, the interrupters 36 and 38 are capable of consistently interrupting the current at the first natural current-zero of the current flowing therethrough following fault-inception, the invention in its broader aspects may be practiced using slightly slower interrupters, e.g., interrupters requiring two or even three natural current zeros following fault-inception for consistently effecting interruption. Even though these latter interrupters may allow current therethrough to persist for one or two additional half-cycles of current, this does not affect the ability of the CLD to effect current-limiting action with respect to current passing through the series combination of interrupters via load terminal 51 since the low impedance path 44 to ground is in place during this interval, thereby diverting most of the current into this path and preventing it from reaching the load circuit assumed to be faulted, as shown at 48.

A disadvantage of allowing current to flow through interrupter 36 for one or two half-cycles following the first natural current zero is that the transformer S is subjected to these additional loops of high current. A transformer is typically designed to be able to withstand such currents for these brief periods without damage, but it is good conservative operating practice to limit the frequency of occurrence of such currents. If only a single loop of current is permitted to flow, as in the preferred embodiment, the transformer can tolerate a larger number of such events. It is to be noted, too, that the current limiting device in many cases will be located some distance away from the transformer, and the impedance of the intervening line section provides some reduction in the maximum current that will flow through the transformer in response to operation of the CLD.

Another disadvantage of allowing current to flow for more than one loop through the series combination of interrupter 36 and the low impedance path 44 to ground is that such prolonged current flow will tend to cause erroneous operation of the additional relays (not shown) protecting this zone and resultant unnecessary tripping of an upstream circuit breaker (not shown). If this prolonged current flow is limited to only one or two loops of current following the first loop, suitable refinements in the relaying system (such as reduction in its speed of operation) can be made to prevent such unnecessary tripping.

In a preferred embodiment of the invention, an impedance, in the form of an inductance 54, is connected in parallel with the series combination of interrupters 36 and 38. When the interrupters 36 and 38 are in their normal, or closed, position of FIG. 1, the inductance 54 is effectively shorted out by interrupters, and no significant current flows therethrough. But when the interrupter 36 interrupts the current therethrough at the first natural current zero, as above described, current thereafter passes through the CLD via the inductance 54. This inductance is of such a value that current therethrough is limited to a value well within the interrupting capability of each of the branch circuit breakers 22, 23, and 24. In one application of the invention the maximum current interrupting capability of each branch circuit breaker is substantially below the prospective current of the system at the branch circuit breaker, assuming the current limiting device 16 was not present.

By way of example and not limitation, the inductance 54 in a preferred embodiment has an impedance of such a value that, when inserted, it limits the current through the power circuit in the event of a fault at the load side of the current limiting device 16 to a value of between ¼ and ½ the maximum current that will flow through the circuit under worst-case fault conditions produced by a fault at the load side of the current-limiting device.

An important purpose served by the load-side interrupter 38 when it opens is isolation of the conductive grounding path 44 from the load terminal 51 of the current limiting device. As a result of such isolation by interrupter 38, current is unable to flow through a path extending from the source side of the current limiting device, through inductance 54, and then to the then-completed grounding circuit 44, as is shown in FIG. 2. The then-open interrupter 38 interrupts any current that was initially flowing through such path when the path was completed and also blocks any continued flow of current through such path once interruption is completed.

Since the grounding circuit 44 is isolated from the rest of the system after the interrupters 36 and 38 have opened and the inductance 54 is then inserted in the circuit, the system is then in a protected state in which fault currents are limited to relatively low values. Accordingly, if the branch circuit breaker 24 is a recloser or reclosing circuit breaker, it can then reclose without producing an objectionably high fault current, even if the severe fault at 48 is still present. In a preferred embodiment of the invention, I maintain the current limiting device 16 in its condition of FIG. 2 (i.e., with the inductance 54 inserted) for a relatively long predetermined period and thereafter return it to its condition of FIG. 1. In this preferred embodiment, the period during which the CLD is maintained in its condition of FIG. 2 is sufficiently long, (e.g., 90 seconds or even more) to allow a downstream recloser such as 24 to proceed through its complete sequence of opening and reclosing operations to lockout before the CLD is restored to its condition of FIG. 1. A suitable timing device (not shown) commands the operator 50 to restore the CLD to its position of FIG. 1 upon expiration of this predetermined period. The CLD is restored to its position of FIG. 1 simply by causing its operator 50 to move through a return stroke.

Although in the preferred embodiment, the impedance 54 is kept in the power circuit for only about 90 seconds, it is to be noted that in some circuit applications, I will keep the impedance 54 in the power circuit for a much longer period of time. For example, in one application, I will keep the impedance 54 in the circuit for the typical duration of a severe lightning storm (e.g., 10 or 20 minutes), thereby effectively limiting the system current during this interval in the event of a lightning-produced fault in a location downstream of the impedance 54.

It is to be noted that a resistance of practical size and design cannot be maintained in the power circuit for such extended periods because of its tendency to overheat, but an inductance such as my inductance 54 is not subject to this severe overheating problem and thus can be maintained connected in the circuit for relatively long desired periods such as above described.

The typical impedance-inserting current-limiting device of the prior art inserts a resistance into the power circuit instead of an inductance because it is much easier to rapidly (i.e., during the first current loop) transfer current into a resistance than into an inductance. But because of overheating problems, as above noted, this resistance can remain in the circuit for only a brief interval, thus making it much more difficult to realize the above-described advantages that I readily attain by inserting (and maintaining inserted) an inductance.

I am able to insert an inductance into the power circuit because I carry out the current-limiting action in two steps, the first of which involves closing the grounding switch 42 to divert current into the low-impedance grounding path 44 and effect current-limitation on the first current loop, and the second of which involves transferring current into the inductance 54, not during the first current loop but at about the time of a natural current zero, when it is much easier to effect such a transfer. In contrast, the usual prior art approach is an essentially one-step one in which, during the first current loop, current is forced to transfer from its normal path into a shunting impedance by developing a relatively high opposing voltage in the normal path.

Although in certain applications I maintain the inductance 54 in the power circuit for a relatively long time following a fault, it is to be understood that the invention in its broader aspects is not so limited. In many circuit applications, it will be sufficient if the inductance is removed immediately after the fault is cleared by a single opening of a downstream circuit breaker. Such removal of the inductance is effected by quickly restoring the CLD from its position of FIG. 2 to its position of FIG. 1 immediately following such fault clearance.

Unidirectional Current Component

It should be mentioned that although closing of the grounding switch 42 exerts a strong current-limiting effect on the current that had been passing through the series combination of the interrupters 36 and 38 into the distribution circuit 14 at the load side of the current-limiting device, the current in this latter portion of the distribution circuit does not immediately drop to zero. While there is no significant rise in this current once the grounding switch closes, a unidirectional, but decaying, component of current does persist due to the inductance of a circuit loop which is then present. Assuming a fault at 48 in FIG. 1, this circuit loop comprises the following elements in series: circuit portion 14 at the load side of the CLD, circuit elements 12, 20, 24, the fault at 48, ground, the grounding path 44, and the interrupter 38 via an arc. This unidirectional current component will decay to near zero in a time proportional to $X_L/R$, where $X_L$ is the inductive reactance of the loop and R is its resistance. The time required for such decay can be up to several cycles of power frequency current. During this decay period there is an alternating component of current from the source S flowing through the series combination of inductor 54 and circuit elements 38, 44, and 42. This alternating current component is superimposed on the above-described unidirectional component then passing through interrupter 38, and its presence reduces the time needed for the total current through interrupter 38 to pass through zero and permit interruption of the loop current by the interrupter 38.

Physical Structure of the Current Limiting Device of FIGS. 1-4

A more detailed, but still somewhat schematic, showing of the physical structure of the current limiting device CLD of FIGS. 1 and 2 is contained in FIG. 3. Here the interrupters 36 and 38 are shown as vacuum-type circuit interrupters of a conventional form. Interrupter 36 comprises a highly evacuated envelope 60 and a pair of separable contacts 62 and 63 within the envelope. Contact 62 is a stationary contact mounted on a stationary contact rod 64 extending in sealed relationship through the upper end of the envelope, and contact 63 is a movable contact mounted on a movable contact rod 65 extending in sealed relationship through the lower end of the envelope. A suitable flexible metal bellows 66 allows contact rod 65 to move vertically without impairing the vacuum inside the envelope. Interrupter 38 is of a substantially identical construction, with its corresponding parts being designated with corresponding reference numerals except for the prefix 1.

The two interrupters 36 and 38 are mounted on a stationary conductive metal plate 70, which, in turn, is supported on spaced-apart insulator 72 and 73. The movable contact rods of the interrupters are electrically connected to the metal plate 70 by means of flexible conductive braids 75 and 175. The plate 70 serves as the conductor 40 of FIG. 1.

Also mounted on metal plate 70 is a third switching device corresponding to the switch 42 of FIG. 1. This switch is preferably one which uses pressurized gas such as compressed air or sulphur hexafluoride ($SF_6$) for dielectric purposes. The switch comprises an insulating housing 80 filled with pressurized gas and a pair of separable contacts 82 and 83 located within the housing. Contact 82 is a stationary contact mounted on a stationary contact rod 84 extending in sealed relationship through the upper end of the housing, and contact 83 is a movable contact mounted on a movable contact rod 85 extending in sealed relationship through the lower end of the housing. The movable contact rod 85 is electrically connected through a flexible braid 88 to the metal plate 70. In FIG. 3 switch 42 is shown in its open position corresponding to its position of FIG. 1.

For mechanically interconnecting the interrupters 36 and 38 and the switch 42 for substantially simultaneous operation, I provide a common operating member, schematically shown as a cross-head 90 movable in a vertical direction only. Connected between cross-head 90 and the movable contact rods 65 and 165 of the two interrupters are two insulating operating rods 91 and 92. Operating rod 91 is suitably connected at its upper end to contact rod 65 and at its lower end to the cross-head 90; and operating rod 92 is suitably connected at its upper end to contact rod 165 and at its lower end to cross-head 90. Preferably, a wipe mechanism 115 of conventional form is provided for connecting the upper end of each operating rod 91 or 92 to its associated contact rod. An example of a suitable wipe mechanism is shown in FIGS. 1 and 2 of my joint U.S. Pat. No. 3,180,960.

Movable contact rod 85 of switch 42 is connected to cross-head 90 through a reversing link 94 mounted on a stationary pivot 95. The left hand end of reversing link 94 is pivotally connected to contact rod 85 through an insulating operating rod 96; and the right hand end of the reversing link is pivotally connected to the upper end of rod structure 98, which structure has its lower end connected to cross-head 90. Rod structure 98 includes a releasable coupling 100, which is shown in more detail in FIG. 4. This releasable coupling is preferably constructed in a manner similar to that shown in U.S. Pat. No. 3,646,292-Barkan et al, assigned to the assignee of the present invention.

Releasable Coupling 100

The releasable coupling 100 normally rigidly interconnects rod sections 102 and 104; but when the coupling is released, the rod sections are capable of moving vertically independently of each other. The coupling comprises a piston 106 coupled to upper rod 102 and a cylinder 108 coupled to lower rod 104. The piston is normally coupled to the cylinder by means of a releasable latch 110, which is preferably a ring latch of the type shown in the aforesaid U.S. Pat. No. 3,646,292-Barkan et al. So long as this latch is in its latching condition of FIG. 4, the piston and cylinder are locked together. But when the latch 110 is released, the piston and lower rod section are free to move downwardly independently of the upper rod section 102 and piston 106. A tension spring 112, shown in FIG. 3, holds the upper rod 102 in its uppermost position against a stop 112 (FIG. 3) if the cylinder 108 is moved downwardly while latch 110 is in its released state.

While I have shown one particular form of releasable coupling, other suitable forms could equally well be used. For example, I could provide a conventional mechanically trip-free mechanism and disable this mechanism by tripping its tripping latch whenever it is desired to effect uncoupling between the driving and driven ends of the mechanism.

Operation of the CLD under Fault Conditions in the Associated Phase

Under the fault conditions described hereinabove in connection with FIGS. 1 and 2, the two interrupters 36 and 38 are opened in unison and substantially simultaneously with closing of the grounding switch 42. Such operation is effected by driving cross-head 90 downwardly from its position of FIG. 3 while the coupling 100 remains in its latched condition. Such downward motion of the cross-head simultaneously drives the two operating rods 91 and 92 downwardly, thereby opening the interrupters 36 and 38 in unison. Such downward motion of the cross-head also drives the rod structure 98 downwardly and acts through coupling 100 and reversing link 94 to drive contact rod 85 of switch 42 upwardly through a closing stroke. Thus, the grounding switch 42 is operated through a closing stroke simultaneously with opening of the interrupters 36 and 38, all in the manner described in connection with FIGS. 1 and 2.

Operation of the CLD under Conditions of No-fault in the Associated Phase

If the CLD is operated from its position of FIG. 1 to its position of FIG. 2 when there is no fault on the phase of the power system in which it is connected, it is highly desirable that grounding switch 42 not be closed to complete grounding circuit 44, thereby avoiding establishment of a high current through the transformer S under such conditions. Releasable coupling 100 permits such operation of the CLD without closing the grounding switch 42. More specifically, the latch 110 is released under such conditions, and the cross head 90 can move downwardly to open the interrupters 36 and 38 without actuating the grounding switch 42.

FIG. 3 illustrates how a manually-initiated operation of the CLD under no fault conditions would be effected. The attendant would close manual switch 115, thus completing an energizing circuit 116 for the solenoid of latch 110. This releases the latch 110, uncoupling the parts of coupling 100. Release of latch 110 closes an auxiliary switch 117, which in turn completes an energizing circuit 118 for the control valve 124 of the operating device 120, soon to be described. The operating device responds by driving the cross-head 90 downwardly, opening interrupters 36 and 38, but without operating the grounding switch 42 because of the then-uncoupled state of coupling 100.

Operating Device 120

For actuating the cross-head 90, an operating device 120 is provided. This operating device may be of any suitable conventional form capable of producing very high speed operation. Preferably, it is of the form shown and claimed in copending patent application Ser. No. 810,663-Barkan & Imam, filed on June 27, 1977, and assigned to the assignee of the present invention, which application is incorporated by reference in the present application. This operating device comprises a cylinder and a piston movable therein by force derived from high-pressure liquid supplied from an accumulator 123. A normally-closed control valve 124 between the accumulator and the cylinder is opened to initiate operation of the operating device 120, and this allows high pressure liquid to flow into the cylinder and produce extreme high speed motion of the piston in a downward direction. The aforesaid piston has a piston rod connected thereto, and such piston rod is shown at 122 in FIG. 3 suitably connected to cross head 90. Piston rod 122 moves downwardly at high speed when the piston is driven as above described, and such downward movement drives the cross-head 90 downwardly at high speed to effect the above-described operation of the CLD.

As described in the aforesaid application Ser. No. 810,663, when the piston of the operating device reaches its fully-operated position, it is latched in such position. The latch for accomplishing this result is shown in FIG. 3 at 125. This latch holds the CLD in its position of FIG. 2 after a high-speed opening operation of the interrupters 36 and 38. Restoration of the CLD to its position of FIG. 1 is effected by releasing this latch 125 with the solenoid 130, and this allows the piston rod 122 to be driven upwardly by fluid pressure in the operator, assisted by a spring (not shown) if desired.

To achieve current-limiting action, the operating device 120 must be exceptionally fast and, more particularly, must be capable of driving the grounding switch 42 through a closing stroke from its position of FIG. 1 to that of FIG. 2 within ¼ cycle of power frequency current, and preferably within 3 milliseconds after inception of a severe fault. An operating device constructed as in the aforesaid application Ser. No. 810,663 is capable of effecting such high speed switch-closing. As previously noted, this operating device 120 is commanded to operate by a high speed relay 49. Relay 49 responds to a severe fault on power line 14 to complete an energizing circuit 132 for the operating means of control valve 124.

When it is desired to restore the CLD to its position of FIG. 1, there is no need for such exceptionally high speed. The operating device 120 operates at more conventional velocities to close the interrupters 36 and 38 and to open grounding switch 42, e.g., within 0.020 to 0.100 seconds after receipt of a command. An important requirement, however, is that the restoration operation must provide for opening of the grounding switch 42 sufficiently early so that it is capable of withstanding its normal dielectric stress before the contacts of the interrupters 36 and 38 are closed sufficiently to reestablish voltage across the grounding switch 42. This is an inherently normal sequence which results from the simple coupling of the three operating rod structures 91, 92 and 98 to the common cross-head 90.

The fact that the switch 42 is a compressed gas switch instead of a vacuum switch contributes significantly to its ability to withstand the voltage applied across it when the interrupters 36 and 38 reclose following switch opening. It is to be noted in this regard that the switch 42 is closed against a high current but is reopened under no-current conditions. This type of duty results in surface irregularities on the contacts detracting from dielectric strength, much more so in a vacuum switch than in a compressed gas switch. Hence, I use a compressed gas type switch as the grounding switch 42.

Modification of FIG. 5

Although, for the sake of simplicity, I prefer to operate the load-side interrupter 38 by means of the common operating device 120 used for the other switching devices, 36 and 42 it should be noted that it is not essential that interrupter 38 be opened as quickly as the source-side interrupter 36 during a current-limiting operation. As pointed out hereinabove, there is a unidirectional component of current passing through interrupter 38 following closing of the grounding switch 42 that may require up to several cycles to decay to near zero; and it is sufficient if the interrupter 38 is then in a condition to interrupt the current therethrough. Accordingly, in one form of my invention (schematically shown in FIG. 5), I operate the load-side interrupter 38 with a separate operator 300 that is commanded to open the interrupter 38 in response to operation of the cross-head 90 into its operated position. When the cross-head reaches its operated position, it closes a control switch 302, completing an energizing circuit for the trip coil 304 for a tripping solenoid which responds by releasing a trip latch 305 and allowing spring 306, acting through operating rod 307, to open the interrupter 38.

In the embodiment of FIG. 5, the common operating device 120 is used for operating only the interrupter 36 and the grounding switch 42. Reclosing of the load-side interrupter 38 is effected by a separate reclosing device 310 of conventional form which is suitably controlled to effect closing of the interrupter 38 at about the same time as closing of interrupter 36. If desired, the separate reclosing device 310 can be omitted, and reclosing of the load-side interrupter 38 can be effected by upward motion of an extension (shown in dotted lines at 312) on the cross-head 90. Downward motion of the extension 312 can occur independently of the operating rod 307 of load-side interrupter 38.

The main advantage of delaying opening of the load-side interrupter 38 during a current-limiting operation is that the duration of the arcing period in this interrupter is reduced since the interrupter 38 remains closed while the above-noted unidirectional component of current therethrough is still relatively high and thus delaying the first opportunity for successful interruption of this current by interrupter 38.

Modification of FIGS. 6–9

FIGS. 6–9 show another modified form of the invention which utilizes one less switching device than the preferred form of FIGS. 1–4. The same reference numerals are used for corresponding parts in the two embodiments. In FIG. 6 the normally-closed interrupter 36 is connected in series with power line 14, and an inductance 54 is connected in parallel with interrupter 36 between its source terminal and its load terminal 51. Connected between the load terminal 51 and ground is a grounding circuit 44 containing a normally-open grounding switch 42.

Grounding switch 42 and interrupter 36 are operated substantially simultaneously from their condition of FIG. 6 to that of FIG. 7 by common operating means 50, which effects this simultaneous operation in response to a fault on the load side of the current limiting device. As in the embodiment of FIG. 1, operating means 50 includes a high speed operator that effects closing of the grounding switch within less than ¼ cycle, and preferably within less than 3 milliseconds, after fault inception. This closing diverts current through the then-closed grounding path 44, effecting current-limiting action with respect to current passing through the power circuit 14 at the load side of the interrupter, in essentially the same manner as in FIGS. 1–4. The interrupter 36, which has then separated its contacts, interrupts this current at the first natural current zero. This results in current being then transferred from interrupter 36 to the shunting path through inductance 54. As will be apparent from FIG. 7, most of this current flows to ground through the then-completed grounding path 44, being limited in magnitude by inductance 54. In order to transfer current to the load circuit, I immediately reopen the grounding switch 42. When the grounding switch 42 is thus opened, it interrupts the current through grounding circuit 44, and thereafter current flows through a path extending through inductance 54 and power circuit 14 to the load. The current interrupted by the grounding switch 42, upon reopening, contains the same persisting unidirection current component explained in connection with the embodiment of FIG. 1 under the heading "Unidirectional Current Component". But as with the embodiment of FIG. 1, there is superimposed on this unidirectional component the above-described alternating current component flowing through inductance 54, grounding path 44, ground, and source S in series, and this alternating component forces the total current in the grounding path through zero to facilitate interruption by grounding switch 42 upon reopening.

The CLD is restored to its position of FIG. 6 after a predetermined period following initial operation of the CLD, thereby effectively removing the inductance 54 from the power circuit. In one embodiment this period is made sufficiently long (e.g., 90 seconds or more) to permit a downstream recloser to proceed through its complete series of opening and reclosing operations to lockout while the inductance 54 is still effectively in the circuit, in essentially the same way as described in connection with FIGS. 1-4. In another embodiment, this period is made much longer (e.g., 10 or 20 minutes) to effectively limit fault current during a severe lightning storm, as was also explained in connection with FIGS. 1-4. In certain other applications, this period will be only sufficiently long to permit clearance of the fault by a single opening of a downstream circuit breaker.

Physical structure capable of performing as above described with respect to FIGS. 6 and 7 is schematically shown in FIGS. 8 and 9. The same reference numerals are used in these figures as in FIG. 3 for designating corresponding parts. When cross head 90 is driven downwardly from its position of FIG. 8 into its position of FIG. 9, it acts to close grounding switch 42 and open interrupter 36. When current has transferred to the inductance 54, a current transformer 135 senses this, picking up a relay 136, which completes an energizing circuit 137 for the latching device 110 of coupling 100. When the latching device 110 is operated in response to completion of circuit 137, the upper operating rod structure 102 is released from the lower operating rod structure 104, allowing spring 112 to open the grounding switch 42, as already described, to interrupt current through grounding circuit 44.

The interrupter 36 is reclosed a predetermined time period after its opening by tripping closing latch 125 with solenoid 130. For energizing solenoid 130 at the appropriate instant, a switch 139 is provided which closes when the cross-head 90 reaches the end of an interrupter-opening operation. Closing of the switch 139 completes an energizing circuit 143 for a time delay device 144, which operates to complete the solenoid-energizing circuit 145 after a predetermined interval.

The modification of FIGS. 6-9 has the advantage of requiring fewer switching devices than the form of FIGS. 1-4, but off-setting this advantage to some extent is the fact that the high speed grounding switch 42 must be provided with means for rapidly reopening it independently of the interrupter 36 to interrupt the current flowing through grounding path 44 and, moreover, must have the current-interrupting capacity to successfully achieve such interruption, all as explained hereinabove. The grounding switch 42 of FIGS. 1-4 requires no significant current-interrupting capacity.

Modification of FIG. 10

To avoid the need for rapidly reopening grounding switch 42, a separate interrupter 140 can be provided in the grounding circuit 44, as shown in the embodiment of FIG. 10. This embodiment is substantially the same as that of FIGS. 6-9 except for the separate interrupter 140 and the fact that the grounding switch 42 has no means for rapidly reopening. In response to a fault, the CLD of FIG. 10 is quickly operated from its position of FIG. 10 into a position corresponding to that shown in FIG. 7, thus transferring current to inductance 54 and the grounding circuit 44. When this occurs, current through the grounding circuit 44 is interrupted by opening separate interrupter 140 while the main interrupter remains in its open position. A predetermined time thereafter, e.g., 90 seconds or more after initial opening of the main interrupter 36, the CLD is returned to its position of FIG. 10.

Polyphase Operation

Polyphase apparatus including current limiting devices embodying the invention can be constructed in a number of different ways, and some of these will now be described.

Independently Operable Single-phase Devices

One form of such polyphase apparatus for a three phase circuit comprises three single-phase current limiting devices, each constructed as shown in FIGS. 1-4. These three single-phase devices are respectively connected in the three phases of the circuit, and each is operable independently of the other in response to a fault on its associated phase.

In another embodiment, three single-phase current limiting devices, each constructed as shown in FIGS. 6-9, are respectively connected in the three phases of the circuit; and each is operable independently of the other in response to a fault on its associated phase.

In still another embodiment, three single-phase current-limiting devices, each constructed as shown in FIG. 10, are respectively connected in the respective phases of a three phase circuit; and each is operable independently of the other in response to a fault on its associated phase.

Figure 12:
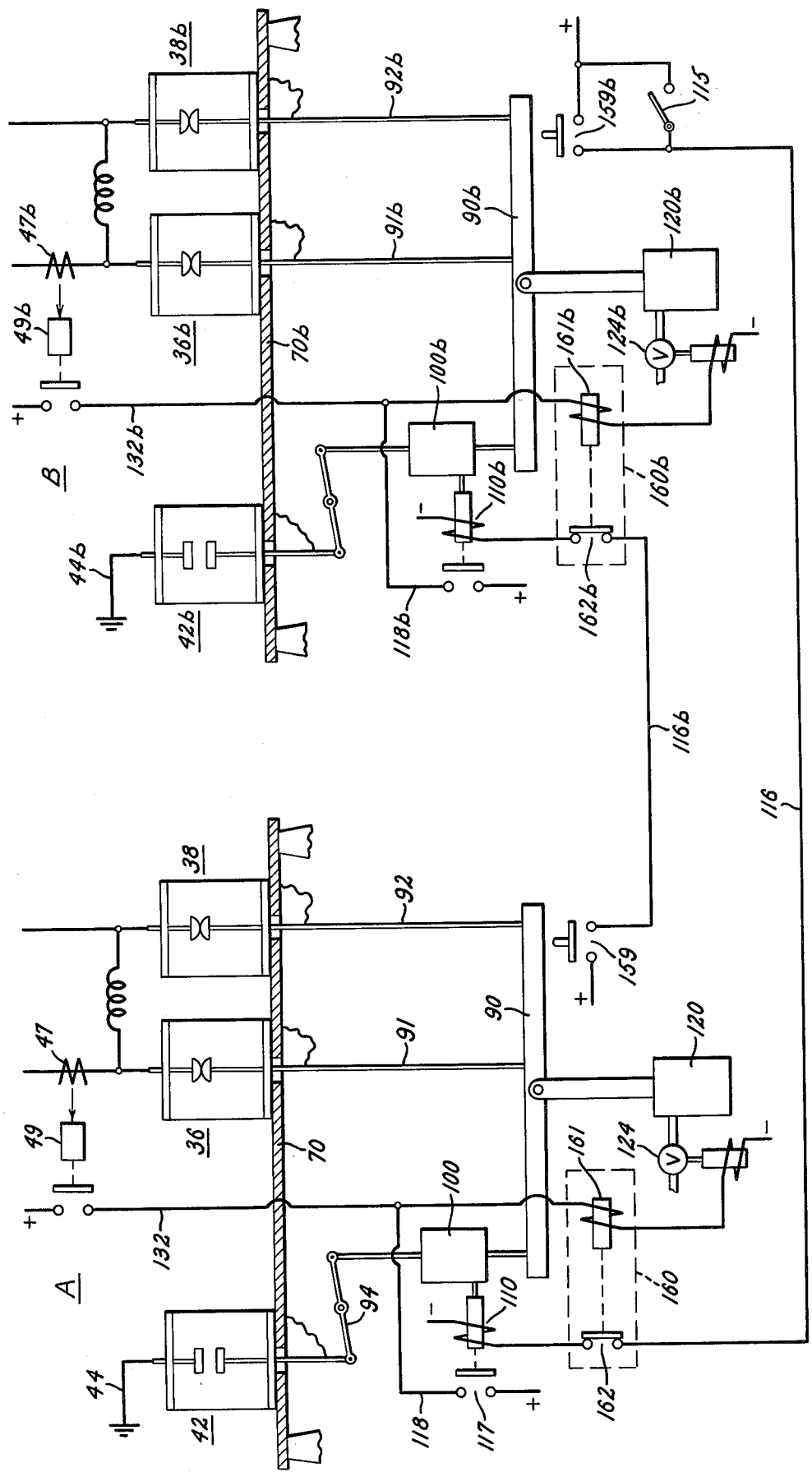
FIG. 12 shows polyphase current-limiting apparatus comprising two CLD's of the type shown in FIGS. 1-4.

The Polyphase Apparatus of FIG. 12

FIG. 12 illustrates another embodiment of polyphase current limiting apparatus, the components for only two phases being shown. The components for one phase are generally designated A and those for the second phase generally designated B. The components for the two phases are substantially identical, and those for the second phase have been given the same reference numerals as corresponding parts in the first phase, except for the suffix b being added for those of the second phase.

In this embodiment of FIG. 12, if there is a fault to ground on one phase alone, then I operate the CLD in that particular phase from a position corresponding to that of FIG. 1 to a position corresponding to that of FIG. 2. In addition, I operate each of the current limiting devices in the other phases from a position corresponding to that of FIG. 1 to that of FIG. 2 except that in any non-faulted phase the grounding switch 42 is not closed but is allowed to remain open. By preventing operation of the grounding switch 42 on any non-faulted phase, I avoid imposing an unnecessary short circuit on that phase, thus reducing the duty on transformer S associated with that phase and also reducing the duty on interrupters 36 and 38 associated with that phase.

FIG. 12 shows how such operation of a polyphase current limiting apparatus can be achieved. Let us assume that a fault develops on phase A but not on phase B. This condition is sensed by the relay 49 associated with phase A, and it responds by completing energizing circuit 132 to cause the operating device 120 of phase A to operate, thereby opening its interrupters 36 and 38 and closing its grounding switch 42. When cross-head 90 of phase A reaches the end of its stroke after this operation, it closes a control switch 159 which, in turn, completes an energizing circuit 116b for the solenoid of latch 110b.

The solenoid of latch 110b responds by uncoupling the coupling device 100b and also completing an energizing circuit 118b for the control valve 124b of operating device 120b. Operating device 120b responds by driving the cross-head 90b downwardly, thereby opening the two interrupters 36b and 38b, as is desired. But since grounding switch 42b has then been uncoupled from the cross-head by release of latch 110b, downward motion of the cross-head 90b does not affect the then-open grounding switch 42b, leaving it in its open position, as desired.

If, instead of the above-assumed conditions, the fault is assumed to have occurred on phase B but not on phase A, then the current-limiting device of phase B would immediately close its grounding switch 42b simultaneously with opening of interrupters 36b and 38b; but the current limiting device of phase A would open its interrupters 36 and 38 without closing its grounding switch 42.

This latter type operation is effected by closing of switch 159b when cross-head 90b of phase B reaches the end of its downward operating stroke. This closing of switch 159b operates latch 110 to uncouple the coupling 100 and also completes energizing circuit 118 for the control valve of the operating device 120. Operating device 120 responds by driving cross-head 90 downward to open the two interrupters 36 and 38, but the grounding switch 42 being then uncoupled from cross-head 90 is not affected by such movement of the cross-head.

In the event of a severe fault developing on both phases A and B at about the same time, it is important that the grounding switches 42 and 42b in both phases be closed as soon as possible following fault-inception. To prevent interference by operation of the CLD in one phase with the desired operation of the CLD in the other phase under these conditions, I provide phase A with blocking means schematically shown in the form of a relay 160 which has a coil 161 in the operation-initiation circuit 132 and normally-closed contacts 162 in the energizing circuit 116 of the solenoid of the latch for coupling 100. Phase B has corresponding blocking means. When the operation-initiation circuit 132 of phase A is completed in response to relay 49 sensing a severe fault, blocking relay 160 is picked up to open its contacts 162 and prevent the coupling-controlling latch 110 from being actuated to disable coupling 100. Thus, if the CLD of phase B should operate slightly ahead of the CLD of phase A but after the relay 49 of phase A has sensed a fault in phase A, such operation of the CLD of phase B will not release the latch 110 of phase A when switch 159b is closed. Relay 160b provides corresponding protection for the CLD of phase A.

After a predetermined period (e.g., about 90 seconds), when closing of the interrupters in each phase is to be effected, the cross-head 90 of each phase is driven upwardly. This recloses all the interrupters 36, 38, 36b, and 38b and opens any grounding switch 42 or 42b then closed but does not affect any grounding switch then open except to reset the associated coupling 100 or 100b to its coupled condition.

Using the Current Limiting Device 16 in a Tie-line

Although FIGS. 1 and 2 show the current limiting device applied in the type of power circuit in which the current source is located at only one electrical side of the CLD, it is to be understood that this CLD can equally well be applied in a power circuit that has a source at both electrical sides of the CLD, e.g., in a bus-tie position as shown in FIG. 11. A severe fault at either side of the CLD at FIG. 11 is quickly sensed by the relay 49, which responds by causing the CLD to operate in substantially the same manner as described hereinabove with respect to FIGS. 1-4. It is to be understood that if the fault is to the left of the CLD, the role of the interrupters 36 and 38 is reversed as compared to the roles described in connection with FIGS. 1-4. That is, interrupter 38 serves the same function as described for the interrupter 36 of FIGS. 1-4, and interrupter 36 serves the same function as described for the interrupter 38 of FIGS. 1-4.

In the system of FIG. 11, there are shown two power lines 14 and 14a and two sources S and $S_A$. The two power lines are interconnected through a tie-line T so that either source is capable of supplying either line. The current limiting device is connected in this tie-line T.

When the current limiting device is used in this manner, an existing system (e.g., one constituted by source S and power line 14 of FIG. 11) may be upgraded by adding an additional source, such as $S_A$ of FIG. 11, for supplying additional loads at a utilization point without the necessity of replacing all the existing circuit breakers and much of the other distribution equipment in order to provide circuit breakers and other equipment capable of handling the substantially greater available currents. Without a device capable of performing a current-limiting function in such a modified system, it would usually be necessary to so replace the circuit breakers and other equipment in order to accommodate the greater available current resulting from the presence of the extra source.

GENERAL DISCUSSION

It will be apparent from the above detailed description that I have provided current limiting devices that are relatively simple, especially since each utilizes conventional components interacting in a simple, though novel, way to achieve the desired overall performance with current-limiting action. While especially high-speed closing of the grounding switch 42 immediately following fault inception is vital to current-limiting action, suitable fault-sensing means and operating means having the required high speeds are nevertheless available in the prior art, as exemplified by U.S. Pat. No. 3,673,455-Dewey for the fault-sensing means and by my joint application Ser. No. 810,663, now U.S. Pat. No. 4,118,613, for the high-speed operating means.

It is to be noted that I achieve current-limitation simply by closing the grounding switch 42 at the required high speed, and without requiring insertion of an impedance into the power circuit as a condition precedent. By using this approach, instead of the impedance-insertion approach, as a way for limiting current on the first current loop I have made the current-limiting task much less difficult and less expensive to carry out. Although I do eventually insert an impedance, such insertion takes place at about the time of a natural current zero, when it is much easier to accomplish.

It is to be noted that the low impedance path established by closing of the grounding switch is effectively present for only a brief period, and its effective removal or isolation at the end of this brief period enables the power system thereafter to operate essentially normally, except as protected by the then-inserted inductance 54.

It is to be further noted that there are no significant continuous losses in my device since the impedance 54 under continuous current conditions is shorted out by the interrupters 36 and 38 (in FIGS. 1-5) or by the interrupter 36 (in FIGS. 6-10). The interrupters are required to perform their interrupting operation only in a conventional way and do not require any unusual arc voltage build-up or dielectric strength recovery characteristics.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A current limiting device comprising:
   (a) two normally-closed circuit interrupters, each interrupter comprising a set of separable contact structures,
   (b) means for electrically connecting said interrupters in series comprising an electrical conductor connected between said two interrupters, with one interrupter at the source side and one at the load side of said conductor,
   (c) a normally-open switch,
   (d) means comprising said switch and effective when said switch is closed for electrically connecting said conductor to ground via a low-impedance conductive path located electrically between said interrupters,
   (e) switch-operating means responsive to a fault on the circuit extending through the series-combination of said two interrupters for rapidly closing said switch, thereby connecting said conductor to ground through said switch,
   (f) said switch-operating means operating at such high speed that effective closing of said switch occurs within ¼ cycle of power frequency current after inception of said fault, thereby effecting current-limiting action with respect to current through said series-combination of interrupters on the load side of said conductive path to ground, said conductive path having a sufficiently low impedance upon closing of said switch to divert through said conductive path despite the presence of said fault sufficient current to effectively produce said current-limiting action,
   (g) means comprising a mechanical coupling between said switch-operating means and one of the contact structures of said source-side interrupter for opening said interrupters in response to said fault sufficiently rapidly that said source-side interrupter interrupts the current therethrough at one of the first three natural current zeros following fault-inception and said load-side interrupter interrupts the current therethrough shortly thereafter, and
   (h) an impedance connected in parallel with said series combination of interrupters, and with no effective connection between said impedance and said conductor except through said interrupters, for conducting current, limited in magnitude by said impedance, around said interrupters when said interrupters have interrupted the respective currents therethrough following their aforesaid opening.

2. A current limiting device as defined in claim 1, in which said source-side interrupter interrupts the current therethrough at the first natural current zero following fault-initiation.

3. A current limiting device as defined in claim 1 and further comprising:
   (a) means for restoring said switch to an open condition following opening of said interrupters, and
   (b) means for restoring said interrupters to a closed condition immediately following initiation of opening of said switch, restoration of said interrupters to closed condition being delayed sufficiently following initiation of opening of said switch to assure that reestablishment of line voltage on said conductor by interrupter-closing will not initiate a breakdown across said switch.

4. The current limiting device of claim 1 in which:
   (a) each of said interrupters comprises movable contact structure movable into engagement with mating contact structure of the associated interrupter to close said associated interrupter and movable out of engagement with said mating contact structure to open said associated interrupter,
   (b) said switch also comprising movable contact structure movable into engagement with mating contact structure to close said switch and movable out of engagement with said latter mating contact structure to open said switch, and
   (c) the means of (e) and (g) of claim 1 comprises means for mechanically interconnecting the movable contact structure of said interrupters and the movable contact structure of said switch for substantially simultaneously opening said interrupters and closing said switch.

5. The current limiting device of claim 4 in which:
   (a) the mechanical interconnecting means of (c) in claim 4 comprises releasable coupling means for coupling the movable contact structure of said switch to the movable contact structure of said interrupters, and
   (b) means is provided for releasing said coupling means when said interrupters are opened while no fault is present on the phase of the power circuit in which said current limiting device is connected, thereby allowing said switch to remain open when said interrupters are opened under said no-fault conditions on said phase.

6. A current limiting device as defined in claim 1 in combination with:
   (a) operation-initiating means operable in response to the occurrence of a fault on the phase of the power circuit in which said current limiting device is connected for initiating operation of the current limiting device immediately upon inception of such a fault, and (b) blocking means responsive to operation of said operating-initiating means for blocking release of said coupling means during an operation of said current limiting device initiated by said operation-initiating means.

7. The current limiting device of claim 1 in which:
(a) said source-side interrupter comprises movable contact structure movable into engagement with mating contact structure to close said source-side interrupter and movable out of engagement with said mating contact structure to open said source-side interrupter,
(b) said switch also comprising movable contact structure movable into engagement with mating contact structure to close said switch and movable out of engagement with said latter mating contact structure to open said switch, and
(c) the means of (e) and (g) of claim 1 comprises means for mechanically interconnecting the movable contact structure of said source-side interrupter and the movable contact structure of said switch for substantially simultaneously opening said source-side interrupter and closing said switch.

8. The current limiting device of claim 7 in which:
(a) the mechanical interconnecting means of (c) in claim 7 comprises releasable coupling means for coupling the movable contact structure of said switch to the movable contact structure of said source-side interrupter, and
(b) means is provided for releasing said coupling means when said interrupters are opened while no fault is present on the phase of the power circuit in which said current limiting device is connected, thereby allowing said switch to remain open when said interrupters are opened under said no-fault conditions on said phase.

9. A current limiting device as defined in claim 1 in combination with blocking means for blocking release of said coupling means during an operation of said current limiting device initiated in response to a fault on the phase of the power circuit in which said current limiting device is connected.

10. The current limiting device of claim 1 in which said source-side circuit interrupter is a vacuum-type circuit interrupter.

11. The current limiting device of claim 10 in which said switch comprises separable contacts and a housing containing compressed gas in which said contacts are located.

12. Polyphase current limiting apparatus comprising:
(a) two current limiting devices, each comprising:
(1) two normally-closed circuit interrupters, each interrupter comprising a set of separable contact structures,
(2) means for electrically connecting said interrupters in series comprising an electrical conductor connected between said two interrupters, with one interrupter at the source side and one at the load side of said conductor,
(3) a normally-open switch,
(4) means comprising said switch and effective when said switch is closed for electrically connecting said conductor to ground via a low-impedance conductive path located electrically between said interrupters,
(5) switch-operating means responsive to a fault on the circuit extending through the series-combination of said two interrupters for rapidly closing said switch, thereby connecting said conductor to ground through said switch,
(6) said switch-operating means operating at such high speed that effective closing of said switch occurs within ¼ cycle of power frequency current after inception of said fault, thereby effecting current-limiting action with respect to current through said series-combination of interrupters on the load side of said conductive path to ground, said conductive path having a sufficiently low impedance upon closing of said switch to divert through said conductive path despite the presence of said fault sufficient current to effectively produce said current-limiting action,
(7) means comprising a mechanical coupling between said switch-operating means and one of the contact structures of said source-side interrupter for opening said interrupters in response to said fault sufficiently rapidly that said source-side interrupter interrupts the current therethrough at one of the first three natural current zeros following fault-inception and said load-side interrupter interrupts the current therethrough shortly thereafter, and
(8) an impedance connected in parallel with said series combination of interrupters, and with no effective connection between said impedance and said conductor except through said interrupters, for conducting current, limited in magnitude by said impedance, around said interrupters when said interrupters have interrupted the respective currents therethrough following their aforesaid opening,
(b) means for connecting the interrupters of one current limiting device in one phase of a polyphase circuit and means for connecting the interrupters of the other current limiting device in a second phase of said polyphase circuit, and
(c) means for causing the interrupters of both of said phases to be promptly opened in response to a fault on one of said phases.

13. The polyphase current limiting apparatus of claim 12 which further comprises means effective when a fault develops on only a single phase for maintaining the switch on any unfaulted phase in open condition while the switch on the faulted phase is closed.

14. The polyphase current limiting apparatus of claim 13 which further comprises means for causing the interrupters of any unfaulted phase to be opened after opening of the interrupters of a faulted phase.

15. Polyphase current limiting apparatus comprising:
(a) two current limiting devices, each comprising:
(1) two normally-closed circuit interrupters, each interrupter comprising a set of separable contact structures,
(2) means for electrically connecting said interrupters in series comprising an electrical conductor connected between said two interrupters, with one interrupter at the source side and one at the load side of said conductor,
(3) a normally-open switch,
(4) means comprising said switch and effective when said switch is closed for electrically connecting said conductor to ground via a low-impedance conductive path located electrically between said interrupters, (5) switch-operating means responsive to a fault on the circuit extending through the series-combination of said two interrupters for rapidly closing said switch, thereby connecting said conductor to ground through said switch, (6) said switch-operating means operating at such high speed that effective closing of said switch occurs within $\frac{1}{4}$ cycle of power frequency current after inception of said fault, thereby effecting current-limiting action with respect to current through said series-combination of interrupters on the load side of said conductive path to ground, said conductive path having a sufficiently low impedance upon closing of said switch to divert through said conductive path despite the presence of said fault sufficient current to effectively produce said current-limiting action, (7) means comprising a mechanical coupling between said switch-operating means and one of the contact structures of said source-side interrupter for opening said interrupters in response to said fault sufficiently rapidly that said source-side interrupter interrupts the current therethrough at one of the first three natural current zeros following fault-inception and said load-side interrupter interrupts the current therethrough shortly thereafter, and (8) an impedance connected in parallel with said series combination of interrupters, and with no effective connection between said impedance and said conductor except through said interrupters, for conducting current, limited in magnitude by said impedance, around said interrupters when said interrupters have interrupted the respective currents therethrough following their aforesaid opening, (b) means for connecting the interrupters of one current limiting device in one phase of a polyphase circuit and means for connecting the interrupters of the other current limiting device in a second phase of said polyphase circuit, and (c) means responsive to a fault on either phase for operating the current limiting device in the associated phase independently of the current limiting device in the other phase.

16. A current limiting device comprising:
(a) a normally-closed circuit interrupter adapted to be connected in series with a power circuit and having a source terminal and a load terminal at opposite electrical sides respectively of said circuit interrupter,
(b) a normally-open switch,
(c) means comprising said switch and effective when said switch is closed for electrically connecting said load terminal to ground via a low-impedance conductive path located electrically at the load terminal side of said circuit interrupter,
(d) switch-operating means responsive to a fault on said power circuit at the load terminal side of said circuit interrupter for rapidly closing said switch, thereby connecting said load terminal to ground through said switch,
(e) said switch-operating means operating at such high speed that effective closing of said switch occurs within $\frac{1}{4}$ cycle of power frequency current after inception of said fault, thereby effecting current-limiting action with respect to current passing in series through said interrupter and said load terminal into the portion of said power circuit at the load side of said conductive path to ground, said conductive path having a sufficiently low impedance upon closing of said switch to divert through said conductive path despite the presence of said fault sufficient current to effectively produce said current-limiting action,
(f) means mechanically interconnecting said interrupter and said switch-operating means for opening said interrupter in response to said fault sufficiently rapidly that said interrupter interrupts current through the interrupter at one of the first three natural current zeros following fault-inception,
(g) an impedance connected in parallel with said interrupter for conducting current, limited in magnitude by said impedance, around said interrupter when said interrupter has interrupted the current therethrough,
(h) and means for reopening said low-impedance conductive path immediately after said interrupter has interrupted and while said interrupter is still open for interrupting current then flowing through said low-impedance conductive path.

17. A current limiting device as defined in claim 16 in which said interrupter interrupts the current therethrough at the first natural current zero following fault-inception.

18. A current limiting device as defined in claim 16 in which:
(a) the means of (h) in claim 16 comprises means for restoring said switch to an open condition following opening of said interrupter, and
(b) means is provided for restoring said interrupter to a closed condition immediately following initiation of opening of said switch, restoration of said interrupter to closed condition being delayed sufficiently following initiation of opening of said switch to assure that reestablishment of line voltage across said switch by interrupter-closing will not initiate a breakdown across said switch.

19. A current limiting device comprising:
(a) a normally-closed circuit interrupter adapted to be connected in series with a power circuit and having a source terminal and a load terminal at opposite electrical sides respectively of said circuit interrupter, said interrupter comprising separable contact structures,
(b) a normally-open switch,
(c) means comprising said switch and effective when said switch is closed for electrically connecting said load terminal to ground via a low-impedance conductive path located electrically at the load terminal side of said circuit interrupter,
(d) switch-operating means responsive to a fault on said power circuit at the load terminal side of said circuit interrupter for rapidly closing said switch, thereby connecting said load terminal to ground through said switch,
(e) said switch-operating means operating at such high speed that effective closing of said switch occurs within $\frac{1}{4}$ cycle of power frequency current after inception of said fault, thereby effecting current-limiting action with respect to current passing in series through said interrupter and said load terminal into the portion of said power circuit at the load side of said conductive path to ground, said conductive path having a sufficiently low impedance upon closing of said switch to divert through said conductive path despite the presence of said fault sufficient current to effectively produce said current-limiting action,
(f) means comprising a mechanical coupling between said switch-operating means and one of the contact structures of said interrupter for opening said interrupter in response to said fault sufficiently rapidly that said interrupter interrupts current through the interrupter at one of the first three natural current zeros following fault inception,
(g) an impedance connected in parallel with said interrupter for conducting current, limited in magnitude by said impedance, around said interrupter when said interrupter has interrupted the current therethrough, and
(h) means effective while said interrupter is open for blocking the flow of current through the series combination of said impedance and said low-impedance conductive path to ground without blocking the flow of current through the series combination of said impedance and a load connected to said power circuit at the load side of said device.

20. The current limiting device of claim 19 in which said interrupter interrupts the current therethrough at the first natural current zero following fault inception.

21. A current limiting device as defined in claim 19 and further comprising:
(a) means for restoring said switch to an open condition following opening of said interrupter, and
(b) means for restoring said interrupter to a closed condition immediately following initiation of opening of said switch, restoration of said interrupter to a closed condition being delayed sufficiently following initiation of opening of said switch to assure that reestablishment of line voltage across said switch by interrupter closing will not initiate a breakdown across said switch.

22. The current limiting device of claim 19 in which:
(a) the separable contact structures of said interrupter comprise movable contact structure movable into engagement with mating contact structure to close said interrupter and movable out of engagement with said mating contact structure to open said interrupter,
(b) said switch also comprising movable contact structure movable into engagement with mating contact structure to close said switch and movable out of engagement with said latter mating contact structure to open said switch; and
(c) the means of (d) and (f) of claim 19 comprises means for mechanically interconnecting the movable contact structure of said interrupter and the movable contact structure of said switch for substantially simultaneously opening said interrupter and closing said switch.

23. The current limiting device of claim 22 in which:
(a) the mechanical interconnecting means of (c) in claim 22 comprises coupling means for coupling the movable contact structure of said switch to the movable contact structure of said interrupter, and
(b) means is provided for releasing said coupling means when said interrupter is opened while no fault is present on the phase of the power circuit in which said current limiting device is connected, thereby allowing said switch to remain open when said interrupter is opened under said no-fault conditions on said phase.

24. A current limiting device as defined in claim 23 in combination with blocking means for blocking release of said coupling means during an operation of said current limiting device initiated in response to a fault on the phase of the power circuit in which said current limiting device is connected.

25. The current limiting device of claim 19 in which the means of (h), claim 19, comprises means for opening said switch and interrupting the current through said low-impedance conductive path shortly after said impedance begins conducting current around said interrupter.

26. The current limiting device of claim 25 in which said impedance is primarily an inductance.

27. The current limiting device of claim 19 in which:
(a) the means of (h), claim 19, comprises an additional interrupter connected in said low impedance path and being in a closed position for carrying current through said low-impedance conductive path when said switch is first closed, and
(b) means is provided for opening said additional interrupter and interrupting the current through said low-impedance conductive path shortly after said impedance begins conducting current around said interrupter of (a), claim 19.

28. The current limiting device of claim 27 in which said impedance is primarily an inductance.

29. The current limiting device of claim 19 in which said impedance is primarily an inductance.

30. The current limiting device of claim 29 in combination with means for restoring said interrupter to closed position and said switch to open position, if it is still open shortly after said impedance has been maintained inserted in said power circuit for a period just sufficient to permit a downstream recloser to lockout after executing a sequence of opening and closing operations in response to said fault.

31. The current limiting device of claim 29 in combination with means for retaining said impedance inserted in said power circuit for at least several minutes after fault-initiation and for thereafter operating said current limiting device to effectively remove said impedance from said power circuit.

32. The current limiting device of claim 19 in which said circuit interrupter is a vacuum-type circuit interrupter.

33. The current limiting device of claim 32 in which said switch comprises separable contacts and a housing containing compressed gas in which said contacts are located.

34. Polyphase current limiting apparatus comprising:
(a) two current limiting devices, each comprising:
(1) a normally-closed circuit interrupter adapted to be connected in series with a power circuit and having a source terminal and a load terminal at opposite electrical sides respectively of said circuit interrupter,
(2) a normally-open switch,
(3) means comprising said switch and effective when said switch is closed for electrically connecting said load terminal to ground via a low-impedance conductive path located electrically at the load terminal side of said circuit interrupter, (4) switch-operating means responsive to a fault on said power circuit at the load terminal side of said circuit interrupter for rapidly closing said switch, thereby connecting said load terminal to ground through said switch, (5) said switch-operating means operating at such high speed that effective closing of said switch occurs within ¼ cycle of power frequency current after inception of said fault, thereby effecting current-limiting action with respect to current passing in series through said interrupter and said load terminal into the portion of said power circuit at the load side of said conductive path to ground, said conductive path having a sufficiently low impedance upon closing of said switch to divert through said conductive path despite the presence of said fault sufficient current to effectively produce said current-limiting action, (6) means mechanically interconnecting said interrupter and said switch-operating means for opening said interrupter in response to said fault sufficiently rapidly that said interrupter interrupts current through the interrupter at one of the first three natural current zeros following fault-inception, (7) an impedance connected in parallel with said interrupter for conducting current, limited in magnitude by said impedance, around said interrupter when said interrupter has interrupted the current therethrough, (8) and means for reopening said low-impedance conductive path immediately after said interrupter has interrupted and while said interrupter is still open for interrupting current then flowing through said low-impedance conductive path, (b) means for connecting the interruptors of one of said current limiting devices in one phase of a polyphase circuit and means for connecting the interrupters of the other of said current limiting devices in another phase of said polyphase circuit, and (c) means for causing the interrupters of both said phases to be promptly opened in response to a fault on one of said phases.

35. The polyphase current limiting apparatus of claim 34 which further comprises means effective when a fault develops on only a single phase for maintaining the switch of any unfaulted phase in open condition while the switch on the faulted phase is closed.

36. A current limiting device having a source terminal and a load terminal at opposite electrical sides thereof comprising:

(a) a normally-closed first circuit interrupter adapted to be connected in series with a power circuit in a location between said terminals, said interrupter comprising separable contact structures, (b) a normally-open switch, (c) means comprising said switch and effective when said switch is closed for electrically connecting the load terminal side of said first interrupter to ground via a low-impedance conductive path located electrically at said load terminal side, (d) switch-operating means responsive to a fault on said power circuit at the load terminal side of said first circuit interrupter for rapidly closing said switch, thereby connecting said load terminal to ground through said switch, (e) said switch-operating means operating at such high speed that effective closing of said switch occurs with ¼ cycle of power frequency current after inception of said fault, thereby effecting current-limiting action with respect to current passing in series through said interrupter and said load terminal into the portion of said power circuit at the load side of said conductive path to ground, said conductive path having a sufficiently low impedance upon closing of said switch to divert through said conductive path despite the presence of said fault sufficient current to effectively produce said current-limiting action, (f) means comprising a mechanical coupling between said switch-operating means and one of the contact structures of said interrupter for opening said interrupter in response to said fault sufficiently rapidly that said interrupter interrupts current through the interrupter at one of the first three natural current zeros following fault inception, (g) an impedance connected in parallel with said interrupter for conducting current, limited in magnitude by said impedance, around said interrupter when said interrupter has interrupted the current therethrough, and (h) means effective while said interrupter is open for blocking the flow of current through the series combination of said impedance and said low-impedance conductive path to ground without blocking the flow of current through the series combination of said impedance and a load connected to said power circuit at the load side of said device, and in which:

(i) said blocking means of (h) comprises an additional interrupter located between said terminals and connected in series with said first interrupter and in parallel with said impedance, considered with respect to the normal load current path through the current limiting device, (j) said low-impedance conductive path is connected between ground and a junction point between said two interrupters, and (k) no effective connection is present between said impedance and said junction point except through said interrupters.

37. The current limiting device of claim 36 in which said impedance is primarily an inductance.

38. A current limiting device comprising:

(a) a normally-closed circuit interrupter adapted to be connected in series with a power circuit and having a source terminal and a load terminal at opposite electrical sides respectively of said circuit interrupter, said interrupter comprising separable contact structures, (b) a normally-open switch, (c) means comprising said switch and effective when said switch is closed for electrically connecting said load terminal to ground via a low-impedance conductive path located electrically at the load terminal side of said circuit interrupter, said conductive path having a sufficiently low impedance upon closing of said switch to divert through said conductive path despite the presence of said fault sufficient current to effectively produce said current-limiting action, (d) switch-operating means responsive to a fault on said power circuit at the load terminal side of said circuit interrupter for rapidly closing said switch, thereby connecting said load terminal to ground through said switch, (e) said switch-operating means operating at such high speed that effective closing of said switch occurs witin ¼ cycle of power frequency current after inception of said fault, thereby effecting current-limiting action with respect to current passing in series through said interrupter and said load terminal into the portion of said power circuit at the load side of said conductive path to ground, (f) means for opening said interrupter in response to said fault sufficiently rapidly that said interrupter interrupts current through the interrupter at the first natural current zero following fault-inception, (g) an impedance connected in parallel with said interrupter for conducting current, limited in magnitude by said impedance, around said interrupter when said interrupter has interrupted the current therethrough, and (h) means effective while said interrupter is open for blocking the flow of current through the series combination of said impedance and said low-impedance conductive path to ground without blocking the flow of current through the series combination of said impedance and a load connected to said power circuit at the load side of said device.

39. The current limiting device of claim 38 in which the means of (h), claim 38, comprises means for opening said switch and interrupting the current through said low-impedance conductive path shortly after said impedance begins conducting current around said interrupter.

40. The current limiting device of claim 38 in which:
(a) the means of (h), claim 38, comprises an additional interrupter connected in said low impedance path and being in a closed position for carrying current through said low-impedance conductive path when said switch is first closed, and
(b) means is provided for opening said additional interrupter and interrupting the current through said low-impedance conductive path shortly after said impedance begins conducting current around said interrupter of (a), claim 38.

41. A current limiting device having a source terminal and a load terminal at opposite electrical sides thereof comprising:
(a) a normally-closed first circuit interrupter adapted to be connected in series with a power circuit in a location between said terminals, said interrupter comprising separable contact structures,
(b) a normally-open switch,
(c) means comprising said switch and effective when said switch is closed for electrically connecting said load terminal to ground via a low-impedance conductive path located electrically at the load terminal side of said circuit interrupter, said conductive path having a sufficiently low impedance upon closing of said switch to divert through said conductive path despite the presence of said fault sufficient current to effectively produce said current-limiting action,
(d) switch-operating means responsive to a fault on said power circuit at the load terminal side of said circuit interrupter for rapidly closing said switch, thereby connecting said load terminal to ground through said switch,
(e) said switch-operating means operating at such high speed that effective closing of said switch occurs within ¼ cycle of power frequency current after inception of said fault, thereby effecting current-limiting action with respect to current passing in series through said interrupter and said load terminal into the portion of said power circuit at the load side of said conductive path to ground,
(f) means for opening said interrupter in response to said fault sufficiently rapidly that said interrupter interrupts current through the interrupter at the first natural current zero following fault-inception,
(g) an impedance connected in parallel with said interrupter for conducting current, limited in magnitude by said impedance, around said interrupter when said interrupter has interrupted the current therethrough, and
(h) means effective while said interrupter is open for blocking the flow of current through the series combination of said impedance and said low-impedance conductive path to ground without blocking the flow of current through the series combination of said impedance and a load connected to said power circuit at the load side of said device, and in which:
(i) said blocking means of (h) comprises an additional interrupter located between said terminals and connected in series with said first interrupter and in parallel with said impedance, considered with respect to the normal load current path through the current limiting device, and
(j) said low-impedance conductive path is connected between ground and a junction point between said two interrupters.

* * * * *